US010384783B2

(12) United States Patent
Murray et al.

(10) Patent No.: US 10,384,783 B2
(45) Date of Patent: Aug. 20, 2019

(54) INERTIAL BREAKOVER MECHANISM

(71) Applicant: Safran Seats USA LLC, Gainesville, TX (US)

(72) Inventors: Michael T. Murray, Ardmore, OK (US); Girish J. Malligere, Lake Dallas, TX (US); Michael Willey, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/747,303

(22) PCT Filed: Jun. 20, 2016

(86) PCT No.: PCT/US2016/038393
§ 371 (c)(1),
(2) Date: Jan. 24, 2018

(87) PCT Pub. No.: WO2017/044170
PCT Pub. Date: Mar. 16, 2017

(65) Prior Publication Data
US 2018/0222361 A1     Aug. 9, 2018

Related U.S. Application Data

(60) Provisional application No. 62/306,301, filed on Mar. 10, 2016, provisional application No. 62/217,314, filed on Sep. 11, 2015.

(51) Int. Cl.
*B60N 2/427* (2006.01)
*B64D 11/06* (2006.01)
*B60N 2/42* (2006.01)

(52) U.S. Cl.
CPC ........ *B64D 11/0619* (2014.12); *B60N 2/4221* (2013.01); *B60N 2/42745* (2013.01);
(Continued)

(58) Field of Classification Search
CPC .......... B64D 11/0619; B60N 2/4221; B60N 2/4228; B60N 2/42745; B60N 2/42772; B60N 2/42781; Y02T 50/46
See application file for complete search history.

(56) References Cited

U.S. PATENT DOCUMENTS 5,163,735 A * 11/1992 Aljundi .............. B60N 2/42781
297/366
5,320,308 A     6/1994 Bilezikjian et al.
(Continued)

FOREIGN PATENT DOCUMENTS

DE     10346397     8/2004
EP     0581592      2/1994
(Continued)

OTHER PUBLICATIONS

U.S. Appl. No. 15/756,951, Non-Final Office Action dated Sep. 18, 2018.
(Continued)

*Primary Examiner* — Philip F Gabler
(74) *Attorney, Agent, or Firm* — Kilpatrick Townsend & Stockton LLP; Dean W. Russell; Kristin M. Crall

(57) ABSTRACT

There is provided a seat break over device. The seat break over device features linkage members that connect the seat back to the quadrant arm. In the static condition, the linkage member acts as a rigid member, constraining rotation of the seat back relative to the quadrant arm. Upon impact of a certain inertial force, the linkage member interacts with a weighted member. The weighted member may include a suspended weight or mass that pivots about a horizontal axis. During a gravity load of a certain amount (e.g., a 16 g event), inertial loads act on the weighted member/hammer, which transfers a force onto the linkage member. This force moves the linkage member into an unstable mode, allowing (Continued)

forward rotation of the seat back with respect to the quadrant arm.

20 Claims, 19 Drawing Sheets

(52) U.S. Cl.
CPC ..... *B60N 2/42772* (2013.01); *B60N 2/42781* (2013.01); *Y02T 50/46* (2013.01)

(56) References Cited

U.S. PATENT DOCUMENTS

| | | | |
|---|---|---|---|
| 5,462,332 A | 10/1995 | Payne | |
| 5,507,555 A | 4/1996 | Kiguchi | |
| 6,109,690 A | 8/2000 | Wu et al. | |
| 6,409,263 B1 * | 6/2002 | Seibold | B60N 2/20 297/216.13 |
| 6,454,351 B2 * | 9/2002 | Motozawa | B60N 2/4221 296/68.1 |
| 6,533,351 B2 * | 3/2003 | Deptolla | B60N 2/4221 297/216.1 |
| 6,568,753 B1 * | 5/2003 | Watanabe | B60N 2/42781 297/216.12 |
| 7,029,067 B2 | 4/2006 | Vits | |
| 7,354,105 B2 | 4/2008 | Nelson | |
| 7,488,035 B2 * | 2/2009 | Kawashima | B60N 2/42745 297/216.12 |
| 7,740,311 B2 * | 6/2010 | Taoka | B60N 2/4221 297/216.1 |
| 8,246,112 B2 * | 8/2012 | Yasuda | B60N 2/4228 297/216.12 |
| 8,991,569 B1 | 3/2015 | Lou et al. | |
| 2002/0030391 A1 | 3/2002 | Merrick | |
| 2007/0085390 A1 | 4/2007 | Kawashima et al. | |
| 2008/0122243 A1 | 5/2008 | Ravid | |
| 2008/0211275 A1 | 9/2008 | Lamparter | |
| 2010/0052378 A1 | 3/2010 | Marriott | |
| 2014/0070578 A1 | 3/2014 | Szelagowski | |
| 2017/0152048 A1 | 6/2017 | Schmeer et al. | |
| 2018/0237142 A1 | 8/2018 | Malligere et al. | |
| 2018/0346125 A1 * | 12/2018 | Thompson | B64D 11/064 |

FOREIGN PATENT DOCUMENTS

| | | |
|---|---|---|
| EP | 1777101 | 4/2007 |
| WO | 2016001374 | 1/2016 |
| WO | 2017044169 | 3/2017 |

OTHER PUBLICATIONS

International Patent Application No. PCT/US2016/038393, International Search Report and Written Opinion, dated Nov. 7, 2016.
International Patent Application No. PCT/US2016/038371, International Search Report and Written Opinion, dated Sep. 26, 2016.

* cited by examiner

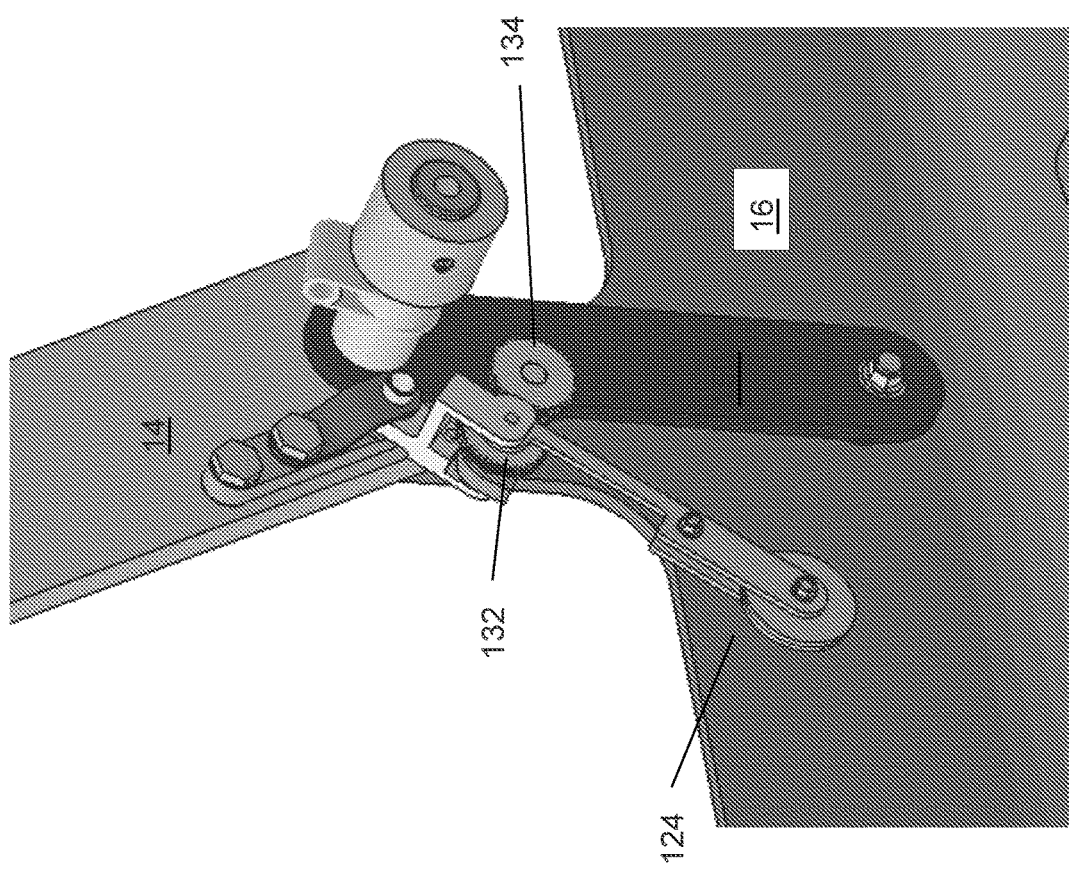

INERTIAL BREAKOVER MECHANISM

CROSS REFERENCE TO RELATED APPLICATIONS

This application is related to and claims priority benefits from U.S. Provisional Application Ser. No. 62/217,314, filed on Sep. 11, 2015, entitled "Inertial Breakover Mechanism," and U.S. Provisional Application Ser. No. 62/306,301, entitled "Mono Pin Seat Back Breakover Mechanism," filed on Mar. 10, 2016, the entire contents of each of which are hereby incorporated by this reference.

This application incorporates by reference the disclosure of a copending PCT patent application. The copending PCT patent application is "CONSOLIDATED SEAT BACK BREAKOVER MECHANISM," PCT Application No. PCT/US2016/038371, to Malligere et al., attorney docket number 038398/1006718, filed on Jun. 20, 2016.

FIELD OF THE INVENTION

The field of the invention relates to break over mechanisms for vehicle seats.

BACKGROUND

Passenger seats, and particularly aircraft passenger seats, are designed to ensure passenger safety in the event of a crash. For example, certain regulations require that seats comply with occupant protection/head impact tests. The general intent is that the seat has a frangible joint designed to fail during an impact, reducing head accelerations. However, the seats must also withstand typical non-crash load abuse, such as passengers leaning heavily against the seat, using the seat as a brace, and other non-crash pressures. Seat design and manufacture thus continues to be an engineering challenge, in both design and performance.

Typically, a seat back is attached to a stable quadrant arm of a seat frame. In order to meet head impact criteria testing, head impact loads are distributed from the seat back to shear pins on both sides of the seat back. The shear pins constrain rotation of the back relative to the quadrant arms until impact. At impact, the shear pins serve as a break over device, designed to fail during an impact event and to allow the back to rotate forward. This can reduce head accelerations. However, shear pins have strict limits on breakout force and timing because they must be strong enough to survive static loading and can only allow break over when impact loads exceed the ultimate load on both pins. The challenge is often that because the shear pins must withstand general abuse loads, they may be so strong as to require excessive acceleration in order to break/shear properly. However, if the strength of the frangible joint/shear pin is reduced, the seat may not be strong enough to withstand expected general abuse loads. For example, some of the current seat designs have problems during 10 degree impact events, when asymmetrical loading on the back requires high rigidity in the back structure to transfer sufficient loads to both shear pins. In general, a shear pin break over device necessitates a highly reinforced back structure, rigid enough to transmit loads to both quadrant arms, but also cushioned to reduce head accelerations on initial impact. Achieving this goal can add weight to the back structure, and can require costly iterations of testing. Improvements to break over devices are thus desirable.

SUMMARY

The terms "invention," "the invention," "this invention" and "the present invention" or "disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there is provided a seat break over device. The seat break over device features linkage members that connect the seat back to the quadrant arm. In the static condition, the linkage member acts as a rigid member, constraining rotation of the seat back relative to the quadrant arm. Upon impact of a certain inertial force, the linkage member interacts with a weighted member, which may have features referred to as a push arm, roller, cam, or "hammer." The weighted member may include a suspended weight or mass that pivots about a horizontal axis. During a gravity load of a certain amount (e.g., a 16 g event), inertial loads act on the weighted member/hammer, which transfers a force onto the linkage member. This force moves the linkage member into an unstable mode, allowing forward rotation of the seat back.

In one example, there is provided a seat break over device, comprising: a linkage member comprising first and second arms configured to hinge with respect one another; the first arm secured to a seat back and the second arm secured to a stable quadrant arm of a seat assembly; a weighted member configured to move upon application of an identified force load; wherein movement of the weighted member causes hinged movement of the linkage member, wherein hinged movement of the linkage member causes movement of the seat back with respect to the stable quadrant arm.

In another example, there is provided a seat back assembly, comprising: a seat back assembly comprising first and second ends, the seat back assembly configured to be pivotally mounted with respect to a quadrant arm; a break over device, comprising first and second linkage members positioned at or near first and second ends of the seat back assembly; each linkage member comprising first and second arms, the first arm secured to the seat back assembly, the second arm secured to the quadrant arm; a pivot point between the first and second arms; a weighted member configured to move upon application of an identified force load; wherein movement of the weighted member causes hinged movement of the linkage member at the pivot point, wherein hinged movement of each of the first and second linkage members causes hinged movement of the seat back with respect to the quadrant arm.

In these examples, further features may be that the weighted member comprises a push arm and a roller. The weighted member may have one or more disk weight members. The seat back may have an extension with which the weighted member pivotably cooperates. The linkage member may comprise a hinge between the first arm and the second arm. There may be an extension spring extending between the first arm and the second arm. There may be a support bar for securing the linkage member to the seat back and the stable quadrant arm. There may be a securement plate and an intermediate bracket securing the first arm of the linkage member to the seat back assembly. There may be a lower securement feature securing the second arm of the linkage member to the stable quadrant arm. The first arm and the second arm can have profiles that interface with one another when the linkage member is in a stable configuration.

In another example, there may be provided a method for causing seat break over upon application of a specified force, comprising: providing a seat back assembly pivotally mounted with respect to a quadrant arm; providing a break over device comprising first and second linkage members positioned at or near first and second ends of the seat back assembly, the first and second linkage members comprising hinged arms; and a weighted member configured to move upon application of an identified force load; wherein movement of the weighted member causes hinged movement of the hinged arms of the linkage member; and wherein hinged movement of each of the first and second linkage members causes hinged movement of the seat back with respect to the quadrant arm.

There may further be provided a seat break over device, comprising: a first gear member associated with a gear housing secured to a seat back and a weighted member that articulates with respect to the seat back; a second gear member associated with a link and a support bar secured to a stable quadrant arm; the weighted member configured to move upon application of an identified force load; wherein movement of the weighted member causes geared movement between the first and second gears which causes hinged movement between the gear housing and the link, creating movement of the seat back with respect to the stable quadrant arm.

BRIEF DESCRIPTION OF THE DRAWINGS

FIG. 21 is a side perspective view of the break over device of FIGS. 13-20 during break over action.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The embodiments of the break over device that are shown and described replace traditional shear pins with an inertial break over device 10. The inertial break over device 10 does not rely on the head impact force to initiate the break over. Instead, the inertial force during a crash event at a certain g-load will trigger the device independently. In some examples, the g-load may be 16 g. However, the inertial break over device 10 may be tunable and timed. By adjusting the timing of the device, head impact loads can be minimized, increasing passenger safety in the event of an impact or crash event. By adjusting the weight of the device, the force required for activation can be adjusted. Because a load path is not needed to shear a pin, the back structure can be simplified significantly, reducing cost and weight.

This disclosure also provides the opportunity for a reversible break over. In other words, after a certain g-load event activates the break over mechanism, the seat back may be brought back to an upright position and lock into the original static condition. The seat back itself does not break, nor are there shear pins that need to be replaced. A spring may be provided that allows ease of re-adjustment of the linkage member, as described below.

While the inertial break over device 10 is discussed herein as being for use with aircraft seats, it is by no means so limited. Rather, embodiments of the inertial break over device 10 may be used in passenger seats or other seats of any type or otherwise as desired. In addition, the device itself can be mounted in a different manner or location in a seat to initiate an inertial switching to activate any part of the seat for energy absorption. For example, it may be desirable for a portion other than the seat back to "breakover." In such instance, the devices described herein may be used.

Figure 1:
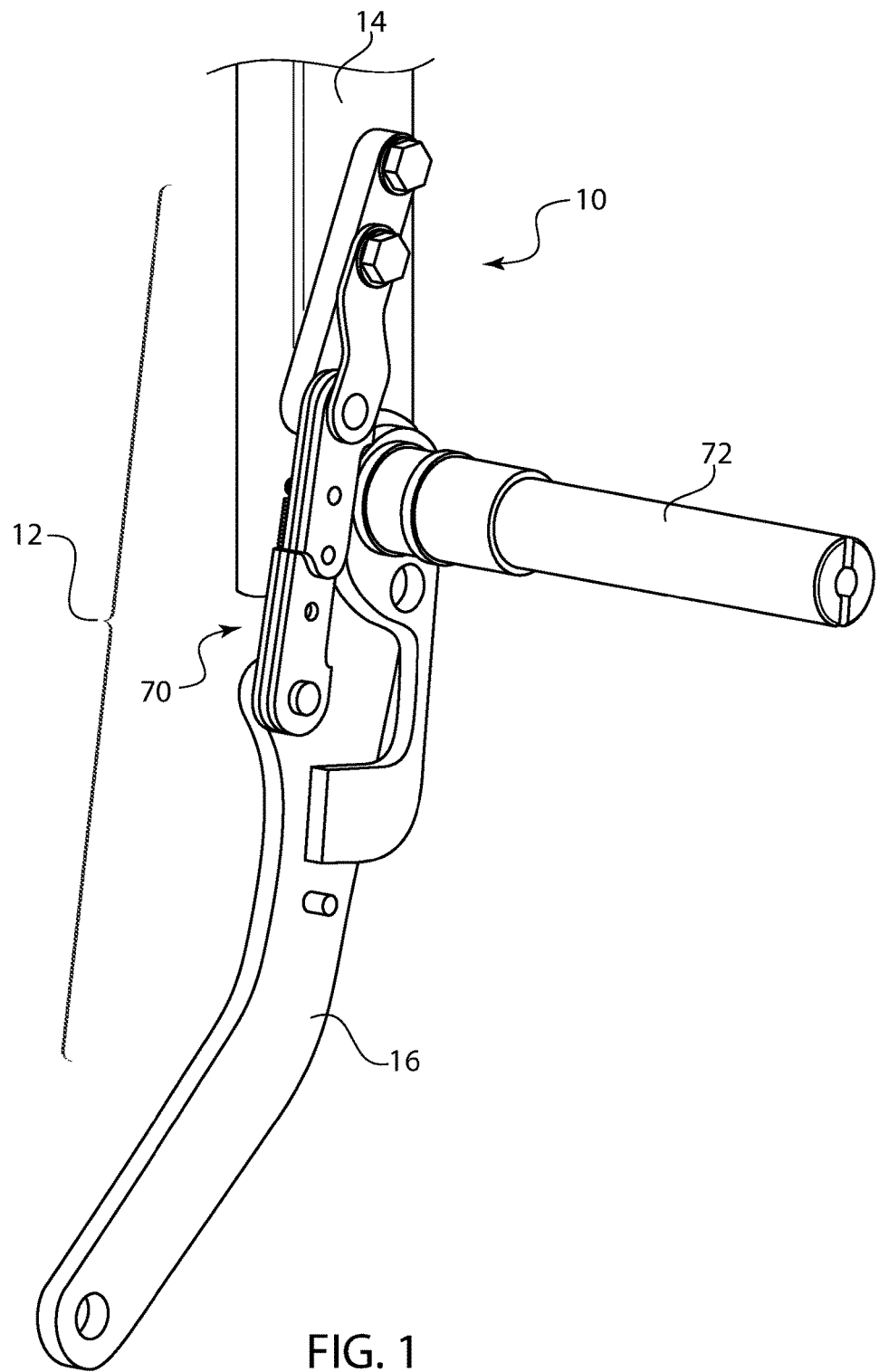
FIG. 1 is a side perspective view of one embodiment of a seat break over device.
Figure 2:
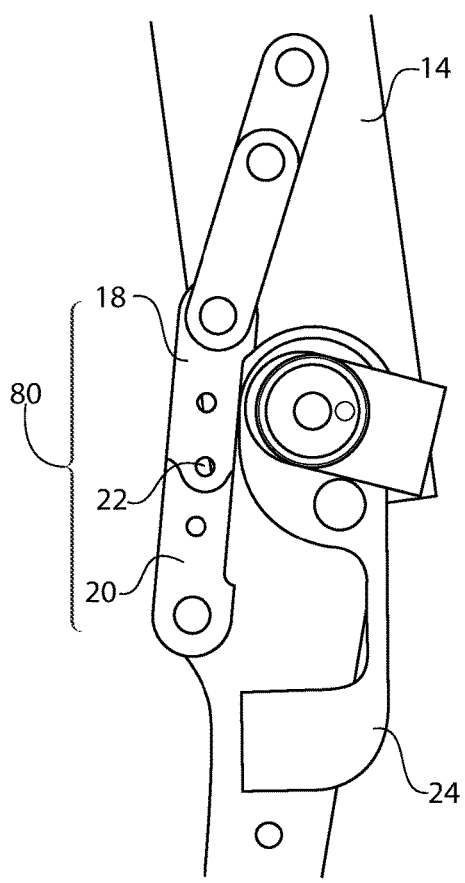
FIG. 2 is a side plan view of the seat break over device of FIG. 1 in a stable configuration.
Figure 3:
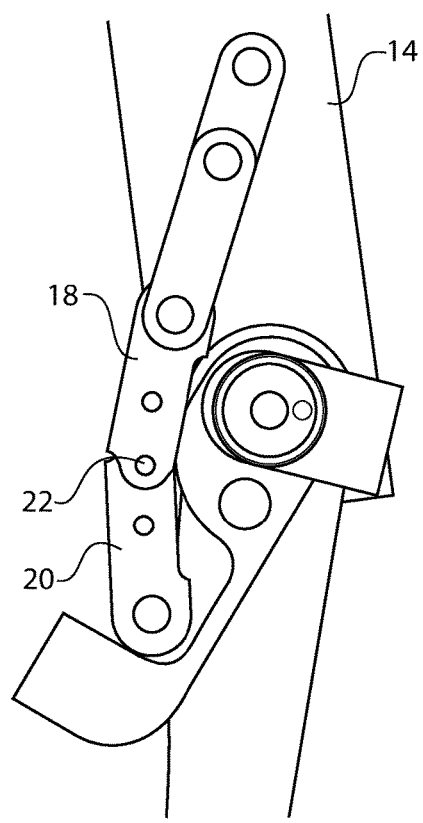
FIG. 3 is a side plan view of the seat break over device of FIG. 1 in weight movement configuration.

FIG. 1 illustrates one example of an inertial break over device 10 positioned on a seat assembly 12. The seat assembly 12 includes a back assembly 14 that forms the back portion of the seat. The seat assembly 12 also includes a quadrant arm 16. In use, the break over device 10 allows movement between the back assembly 14 and the quadrant arm 16. The break over device 10 is shown as generally positioned along the back assembly 14, at a junction point 70 where the back assembly 14 meets the quadrant arm 16. FIG. 2 illustrates the break over device 10 in a stable position, before break over. FIG. 3 illustrates break over device 10 in an unstable position, after break over. Figures illustrating the entire sequence are described in more detail below. As discussed, rather than requiring shear pins for this movement to occur, the movement between the stable (FIG. 2) and unstable position (FIGS. 3 and 4) of the break over device 10 is accomplished only when certain acceleration levels are reached. When break over does occur, rotation at the junction/pivot point 70 is allowed to occur.

In general, the break over device 10 has a linkage member 80 that is formed by two arms 18, 20. The two arms 18, 20 generally cooperate at a hinge 22. At a set acceleration level, a weighted member 24 is caused to swing, which in turn causes arms 18, 22 to unlock and hinge with respect to one another. The initial acceleration/g-load causes movement of the weighted member 24. Inertial force causes continued movement of the weighted member 24 in order to hinge the linkage member 80. This hinging allows movement of the seat back assembly frame 14 to which the upper arm 18 is secured. In FIGS. 1-3, the weighted member 24 is illustrated as being a curved hammer. It is possible, however, for the weighted member 24 to have alternate configurations, as described further below.

Figure 4:
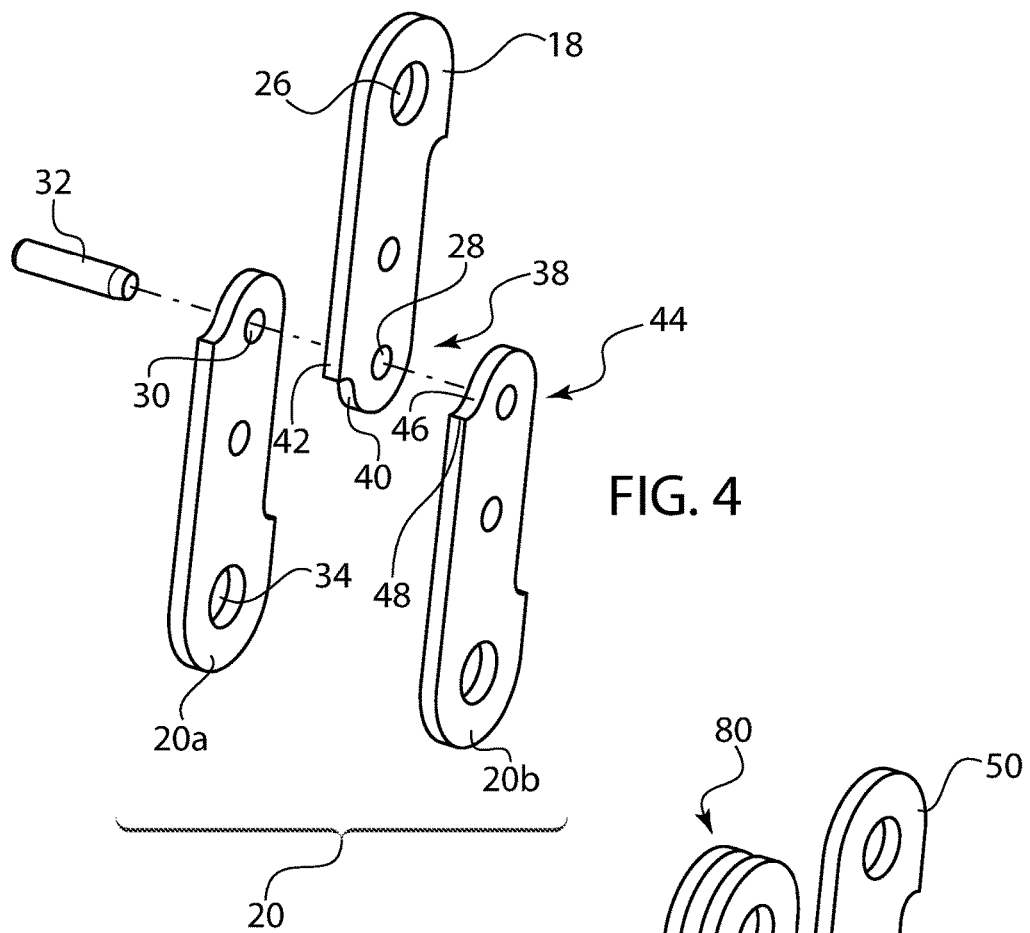
FIG. 4 is an exploded view of a linkage member.
Figure 5:
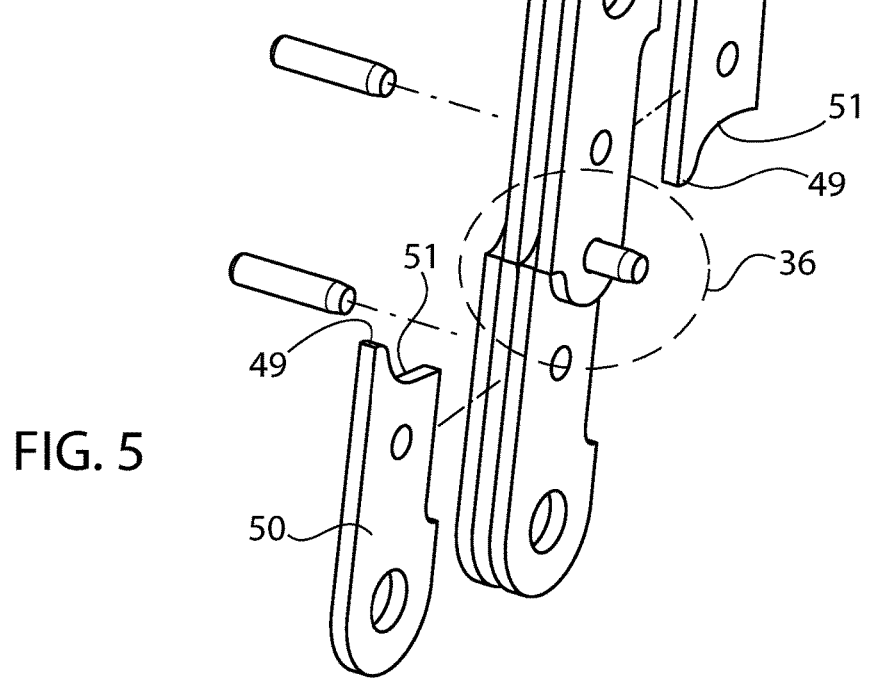
FIG. 5 is an exploded view of a linkage member with support portions.

Referring now more specifically to the figures and specific components of the device 10, FIGS. 4 and 5 illustrate one way in which the arms 18, 20 of linkage member 80 may be assembled. Upper arm 18 is generally provided with a back assembly securement feature 26. This feature 26 may be an opening that receives a corresponding bracket and/or fastener. However this feature 26 may be any other appropriate securement feature. The securement between arm 18 and the back assembly 14 should be rigid, such that movement of the arm 18 causes corresponding movement of the back assembly 14. The arm 18 is also shown as having a hinge pin receiving portion 28.

Lower arm 20 has a similar hinge pin receiving portion 30. As described further below, a hinge pin 32 facilities hinged cooperation between upper arm 18 and lower arm 20. Lower arm 20 also has a quadrant arm securement feature 34. This feature 34 may be an opening that receives a corresponding bracket and/or fastener. However this feature 34 may be any other appropriate securement feature. FIG. 4 illustrates that lower arm 20 may be designed as a double arm, such that lower arm portion 20a and lower arm portion 20b may sandwich a lower end of upper arm 18.

The arms of linkage member 80 have profiles 36 at the ends. The profiles 36 cause the arms 18, 20 to abut with respect to one another, such that no movement is allowed therebetween until the profile 36 is broken. For example, the lower end 38 of upper arm 18 is shown as being a curved end with an inwardly curved/concave portion 40 that ends at heel 42. The upper end 44 of the lower arm portions 20a, 20b has a curved end with an inwardly/concave portion 46 that ends at heel 48.

As illustrated by FIG. 5, it is also possible to provide inner and/or outer support portions 50 that can help structurally support the linkage member 80. These support portions 50 are shown as having a curved face 51 and heel 49 that cooperates with a corresponding curved end 40, 46 and heel 42, 48 of arm portions 18, 20. The completed linkage member 80 is illustrated in FIG. 6, along with surrounding elements.

Figure 6:
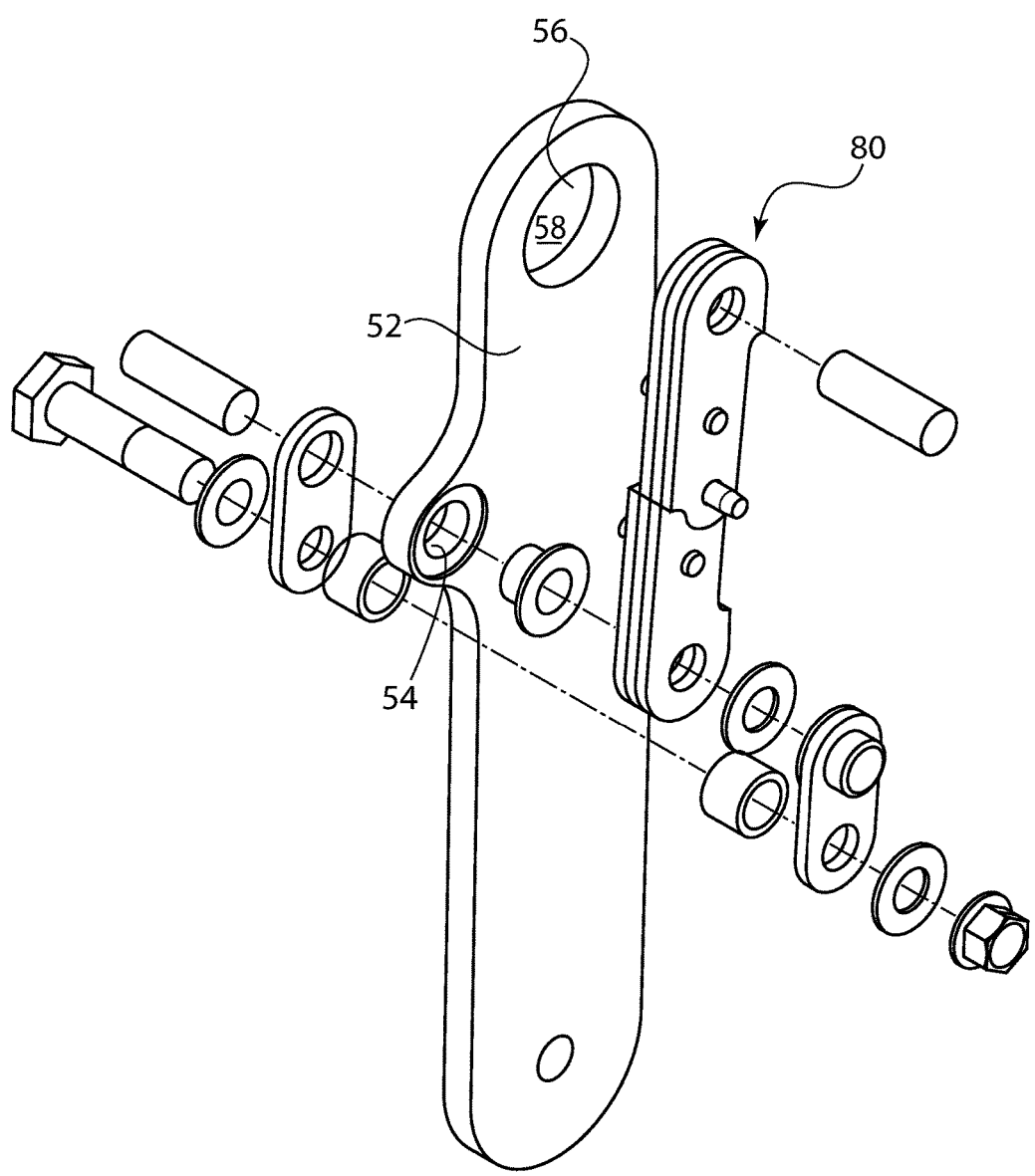
FIG. 6 is an exploded view of a support bar and an assembled linkage member.

FIG. 6 also shows support bar 52. Support bar 52 has a seat back assembly securement feature 54. The seat back assembly securement feature 54 may be provided as an opening in the support bar 52. The opening may be reinforced by one or more brackets or bushings. Support bar 52 also has a weighted member securing feature 56. The weighted member securement feature 56 may be provided as an opening 58 in the support bar 52.

Figure 7:
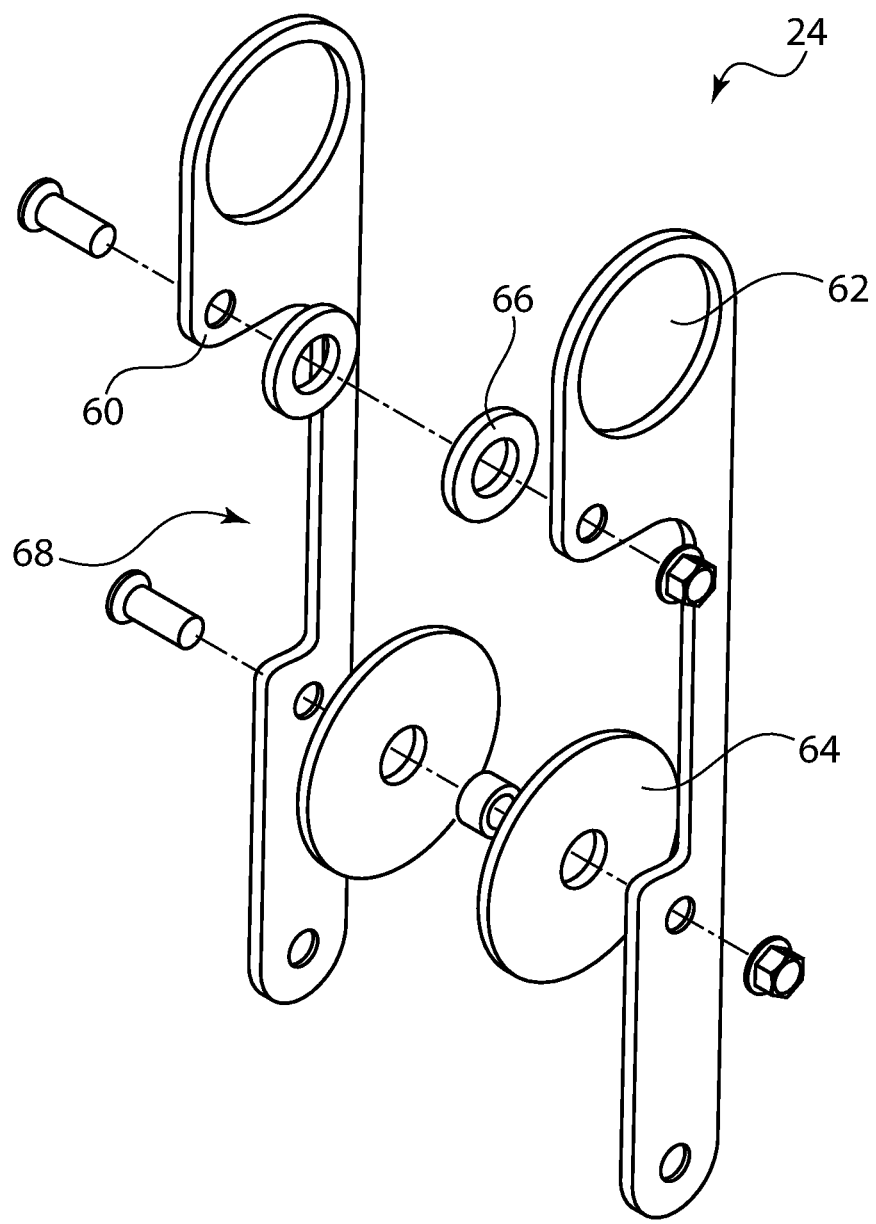
FIG. 7 is an exploded view of a weighted member.
Figure 8:
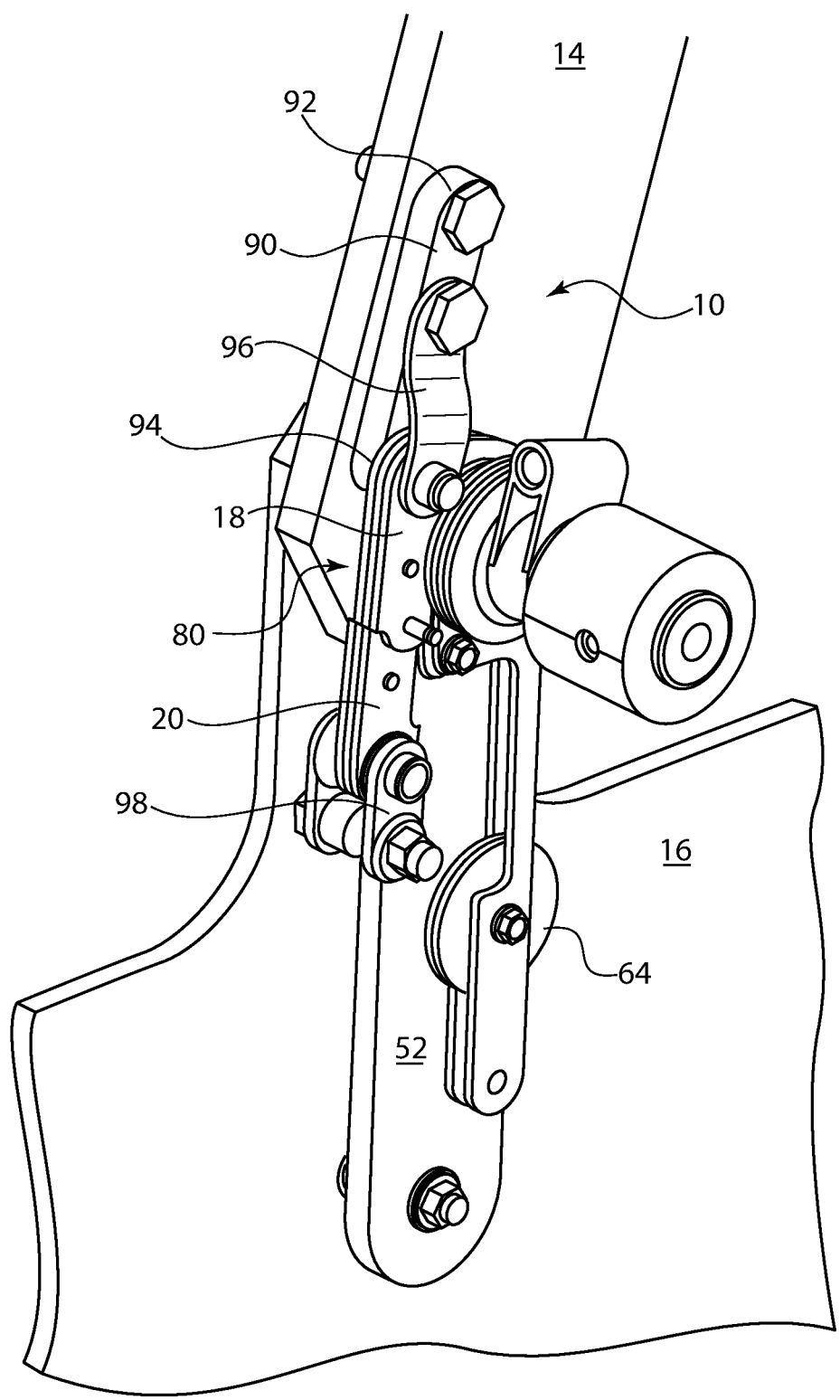
FIG. 8 is a side perspective view of one embodiment of a seat break over device.

Referring now to FIG. 7, an alternate embodiment of a weighted member 24 is shown. The weighted member 24 includes a push arm 60 which is designed to apply pressure against the hinge 22 of the linkage member 80 when the weighted member 24 is caused to move. The push arm 60 may be a cam, a hammer, a lobe, an extending member, or any other member that can apply the desired/required pressure to the linkage member 80. The weighted member 24 may also have a pivot point 62. Pivot point 62 provides a connection point to the support bar 52 about which the weighted member 24 can pivot. The weighted member 24 also features a weight member 64. The weight member 64 may be provided as one or more weighted disks, weighted blocks, or any other appropriate member that can add weight to the weighted member 24. The push arm 60 of the weight member 64 may have a roller 66 secured to or otherwise associated with the push arm 60. The roller may be offset with respect to the centerline of the weighted member, as illustrated by FIGS. 7 and 8. Forward movement of the push arm 60 causes the roller 66 to abut/force/bump against the hinge 22. An assembled and installed break over device is shown by FIG. 8.

FIG. 8 illustrates the support bar 52 having the weighted member 24 secured thereto. This figure also illustrates an optional securement plate 90, which can be used to secure the linkage member 80 to the seat back 14. The securement plate 90 has a first securement location 92 that is rigidly secured to the seat back 14. The securement plate 90 has a second securement location 94 that is hingedly secured to the upper arm 18 of the linkage member 80. The securement plate 90 provides a pivot axis and side support so that the linkage member 80 does not disengage from the seat back assembly 14. There may also be provided in intermediate bracket 96. Intermediate bracket 96 is illustrated as being secured to securement plate 90 and two upper arm 18 of linkage member 80. Intermediate bracket 96 helps support and contain the upper linkage arm 18 from slipping, moving or being forced away due to sideways force/movement/load. FIG. 8 also illustrates a lower securement feature 98. Lower securement feature 98 provides a hinge point between lower arm 20 of linkage member 80 and the quadrant arm 16. Lower securement feature 98 helps support and contain the lower linkage arm 20 from slipping, moving or being forced away due to sideways force/movement/load.

Figure 9:
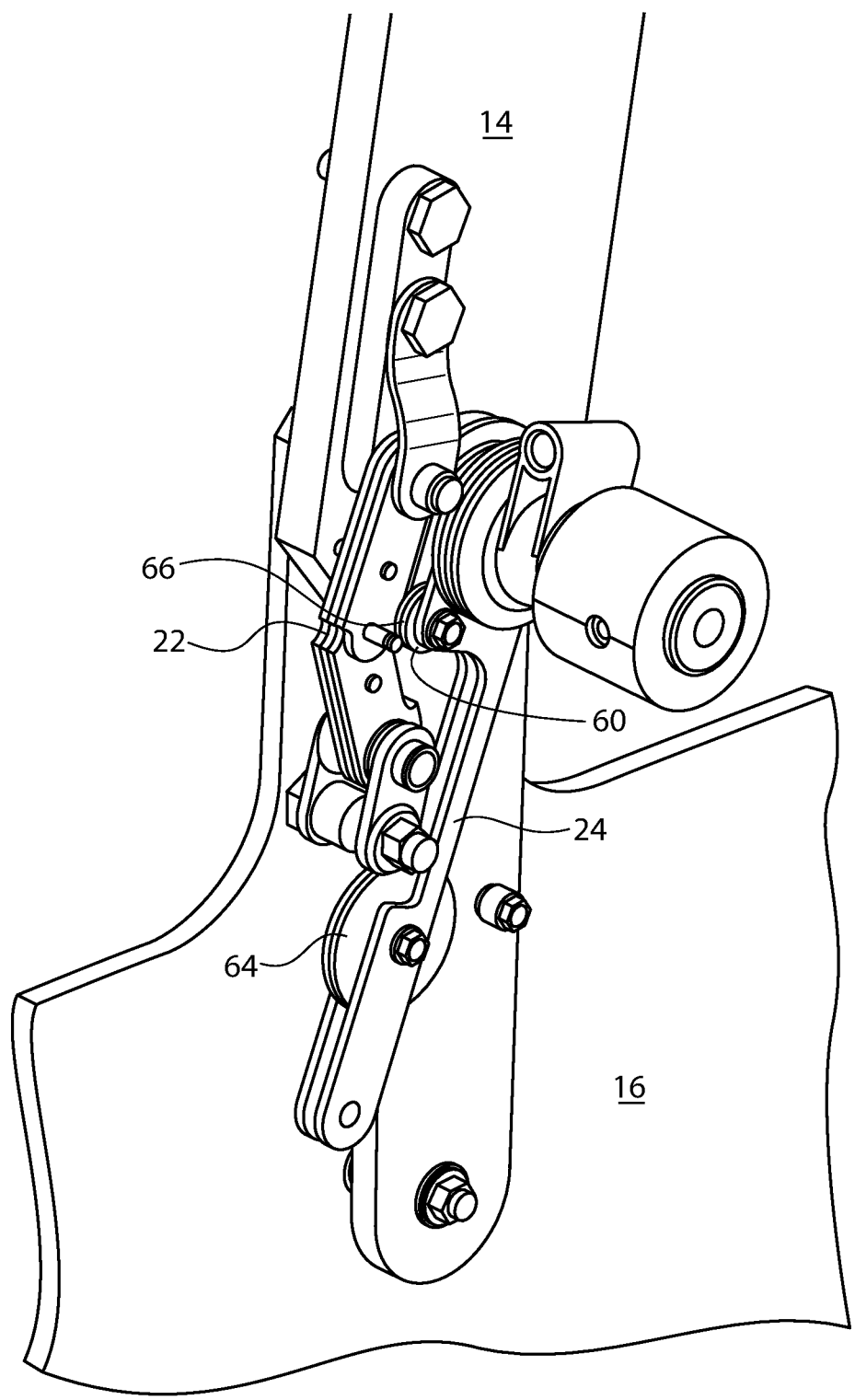
FIG. 9 is a side perspective view of the seat break over device of FIG. 8 in a weighted member movement configuration.
Figure 10:
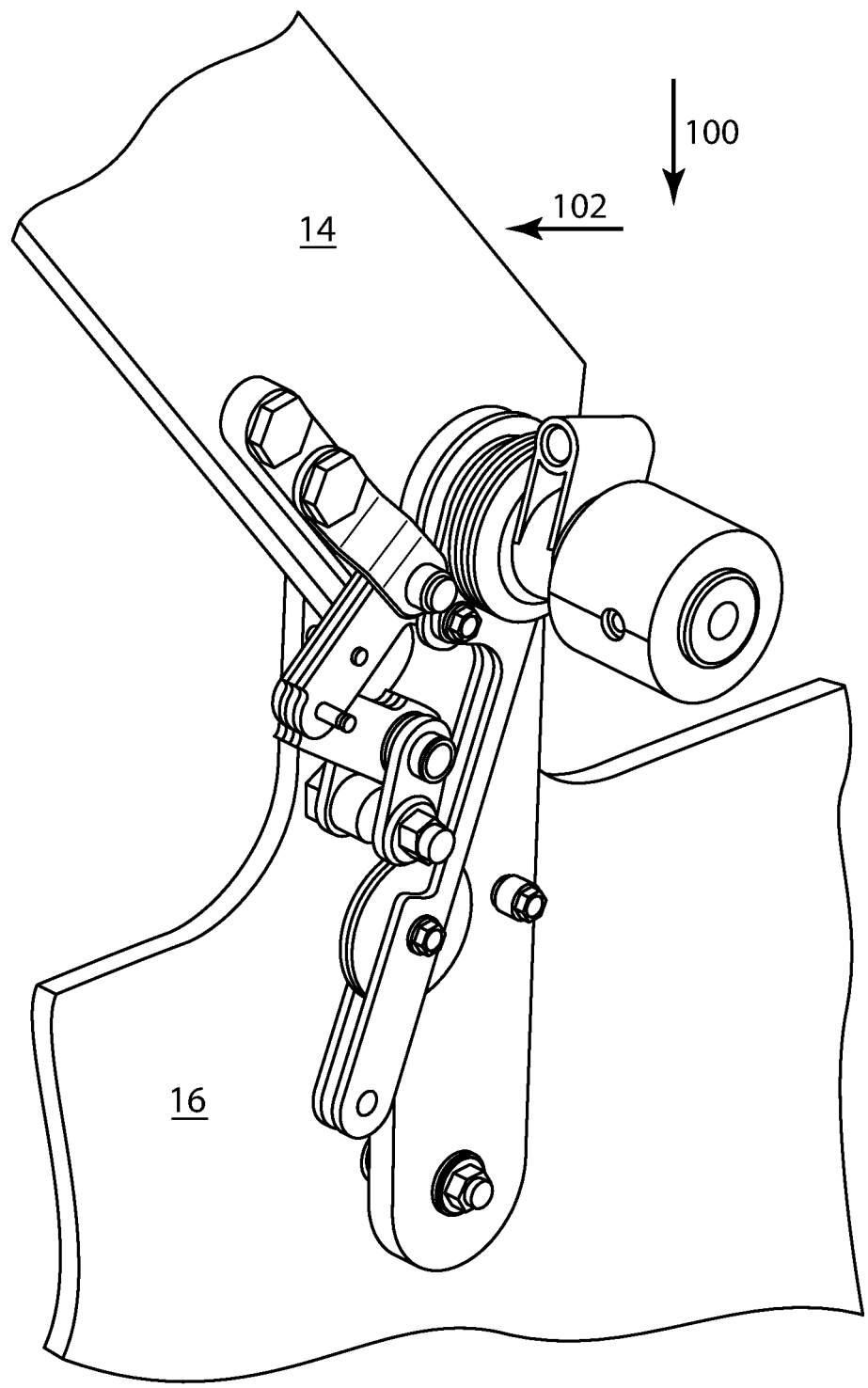
FIG. 10 is a side perspective view of the seat break over device of FIG. 8 further along the weighted member movement configuration, illustrating forward movement of the seat back assembly.

In use, a specified accelerated force will cause movement of the weight member 64 from a stationary position to a swinging position. This is illustrated by FIGS. 8-10. FIG. 8 will illustrates the weight member 64 in a straight down, stationary position. FIG. 9 illustrates the weight member 64 in its moving, swinging position. Once these specified load causes the initial movement, inertial load takes over and causes continued movement of the weight member 64. In the position illustrated by FIG. 9, push arm 60/roller 66 is caused to apply pressure to hinge 22. Activation of hinge 22 causes bending of the linkage member 80. Bending of the linkage member 80 causes articulation between the back assembly 14 and the quadrant arm 16, allowing break over of the seat back assembly 14. The weighted member 24 may also feature a free space 68. Free space 68 provides an opening that can allow elements of linkage member 80 to move without interference along the weighted member 24.

Once movement of the linkage member 80 is begun, the continued acceleration and weight of the seat back 14 can force the seat back 14 to move forward. This is allowed now that the column load in the direction of arrow 100 is converted to movement load in the direction of arrow 102. The weighted member 24 may be calibrated such that only certain loads/forces cause movement of the weight member 64 and consequent movement of the push arm 60. For example, the number and size of the weights assembled on the weighted member may be changed.

Figure 11:
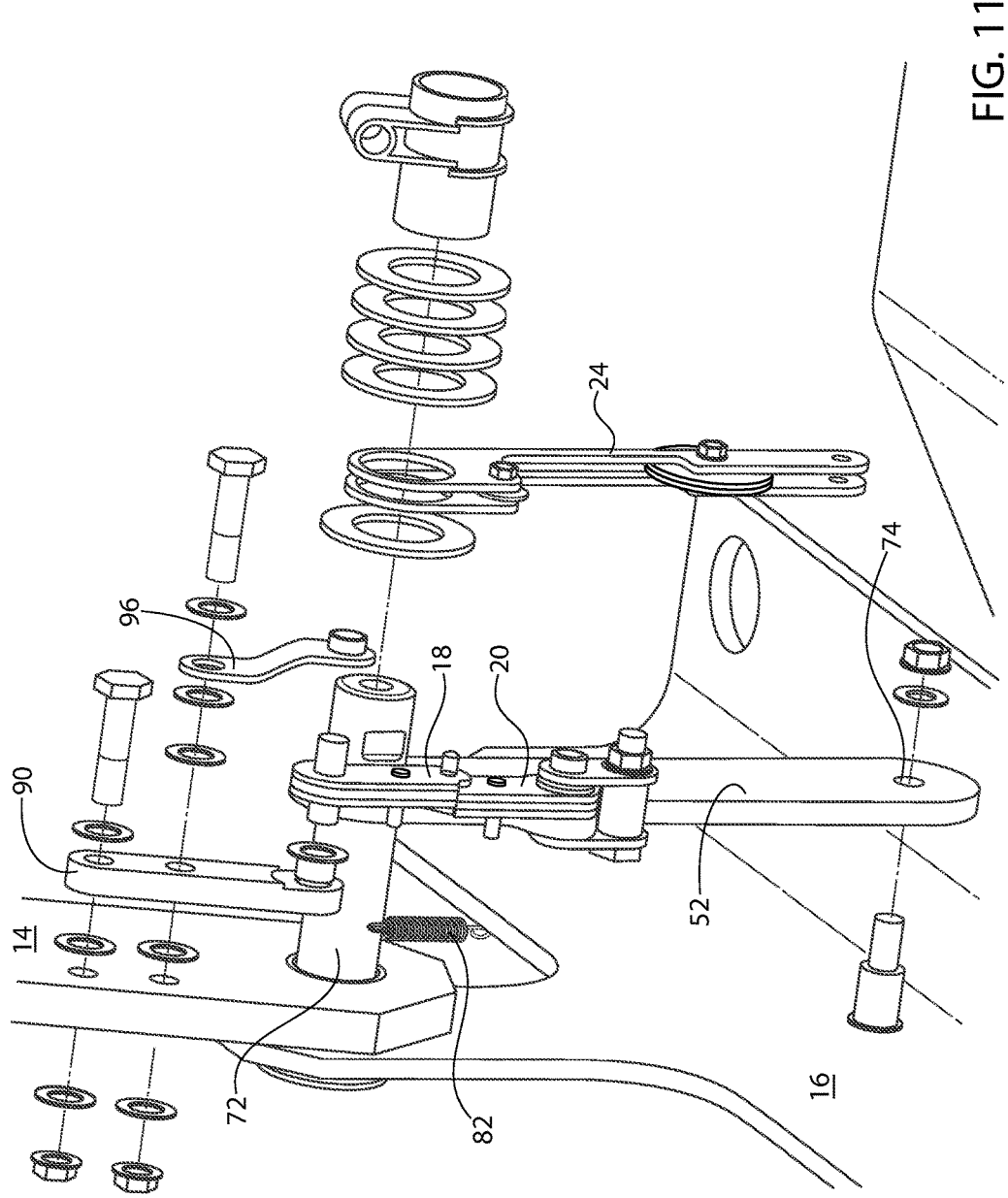
FIG. 11 is a perspective exploded view of the seat break over device of FIG. 8.

As illustrated by FIG. 1 and the exploded view of FIG. 11, the quadrant arm 16 may have an extension 72. The seat back 14 may have a receiving portion that is received onto the extension 72. This can allow pivotal movement with respect to the seat back 14 and the quadrant arm 16. In another embodiment, the seat back 14 features the extension 72, and the extension 72 may be received by an opening or receiving portion of the quadrant arm 16. In either example, the weighted member 24 may cooperably slide onto the extension 72.

In use, the weighted number 24 is allow free rotation with respect to the extension 72. Only a specified g-load, however, will cause the required movement of weighted member 24 to activate linkage member 80. The support bar 52 may also have a quadrant arm connection 74. This connection point 74 can allow securement of the support bar 52 to the quadrant arm 16. FIG. 11 also illustrates the presence of various fasteners, washers, and bolts, which may be used to secure the describes components to one another. Other cooperation configurations are possible and considered within the scope of this disclosure.

As illustrated by FIG. 11, the linkage member 80 may also be associated with an extension spring 82. The extension spring 82 may maintain the linkage member ends in their aligned configuration. A spring over center design allows the pressure from the weighted member 24 to force the spring 82 beyond its center, providing the torque to rotate and allow hinging.

Spring 82 can help arms 18, 20 rebound back to their aligned position after the force event is complete. In use, a first end of spring 82 may be attached to arm 18 and a second end of spring 82 may be attached to arm 20. The extension spring 82 can assist in maintaining a stable compression mode.

Figure 12:
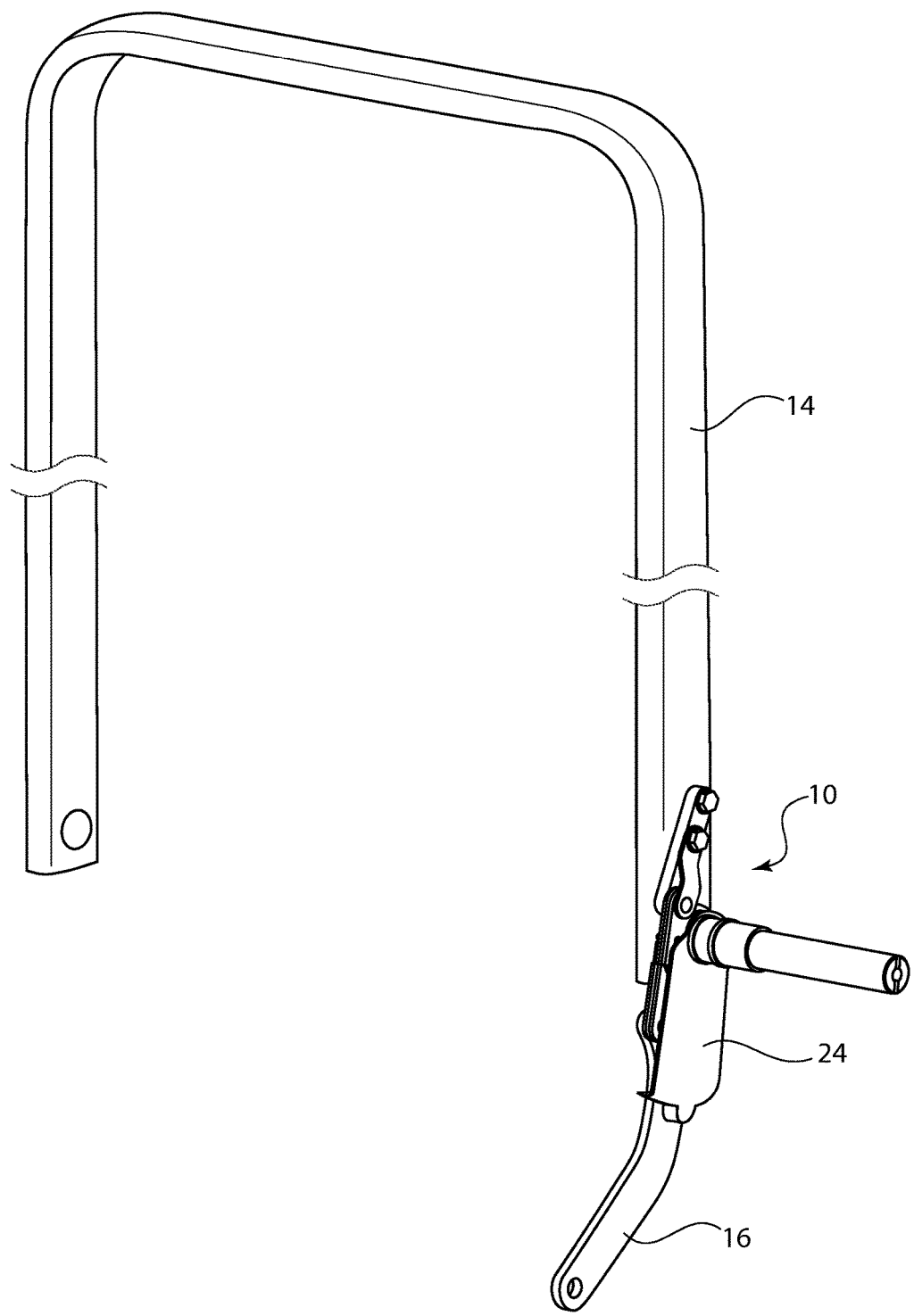
FIG. 12 is a side perspective view of a seat break over device positioned on a seat back assembly and a quadrant arm.

FIG. 12 illustrates an alternate seat break over device. In this example, the breakover device 10 is shown fully installed on the seat back frame 14.

Figure 13:
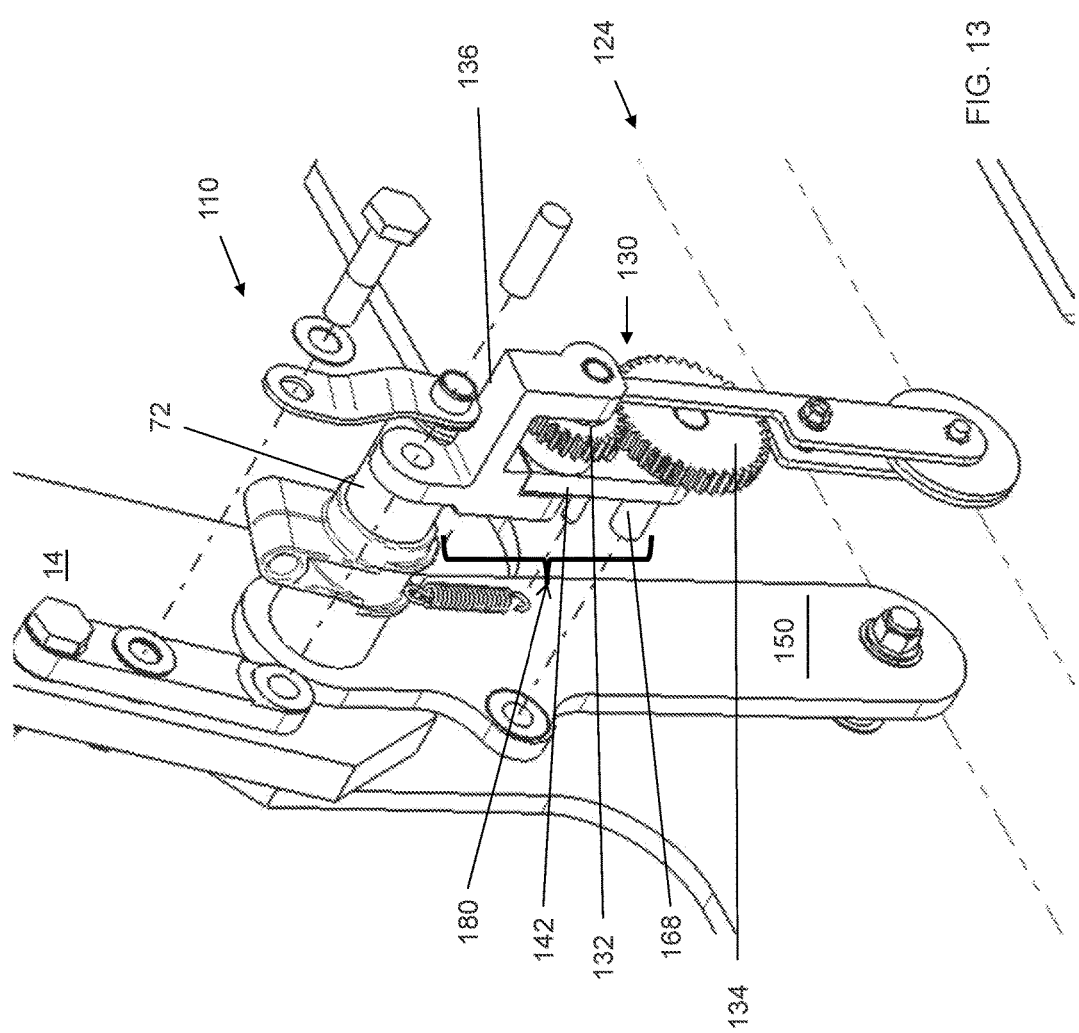
FIG. 13 is a side perspective view of a geared break over device.
Figure 14:
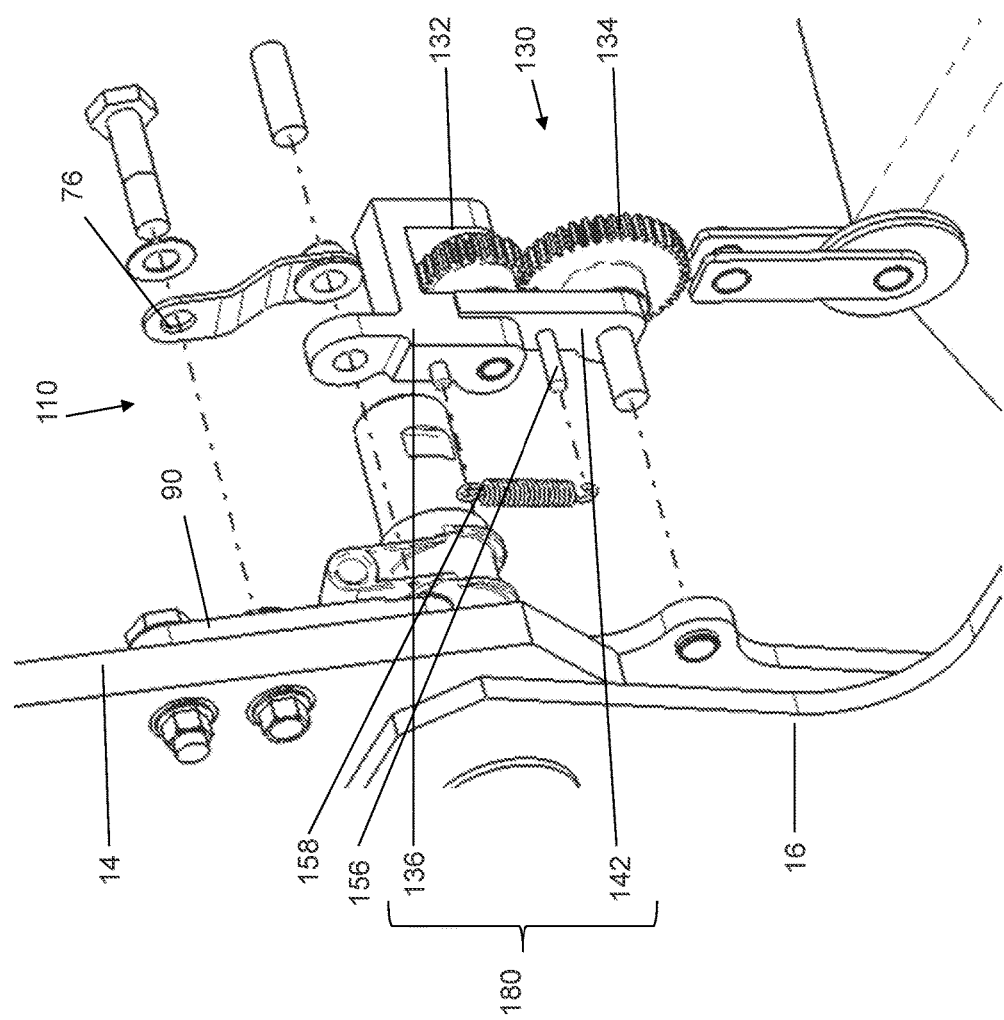
FIG. 14 is a size exploded view of the break over device of FIG. 13.

FIGS. 13 and 14 illustrate an alternate embodiment of a break over device 110. This device 110 uses a similar weighted member 124 as described above, but incorporates a gear system 130. The gear system 130 can help control movement of the weighted member 124 along a smooth and guided path. The gear system 130 can also guide movement and controlled disassociation of the linkage system 180 members (defined by upper gear housing 136 and link 142). When the upper gear housing 136 and link 142 are moved or allowed to become angled with respect to one another upon an inertial load, the seat back is allowed to "break over" as described in more detail below.

The gear system 130 is shown having a first gear 132 and a second gear 134. The first gear 132 is shown as associated with the weighted member 124 and supported by a gear housing 136. The second gear 134 is shown associated with a link 142 and a support bar 150. Cooperation between gears 132 and 134 will be described in more detail below. The gears are illustrated as having different sizes in FIGS. 13-18 and as having the same or similar sizes in FIGS. 19-21. Both options are possible and considered within the scope of this disclosure. Providing different sizes may change the timing of the breakover, which may or may not be desirable.

Figure 15:
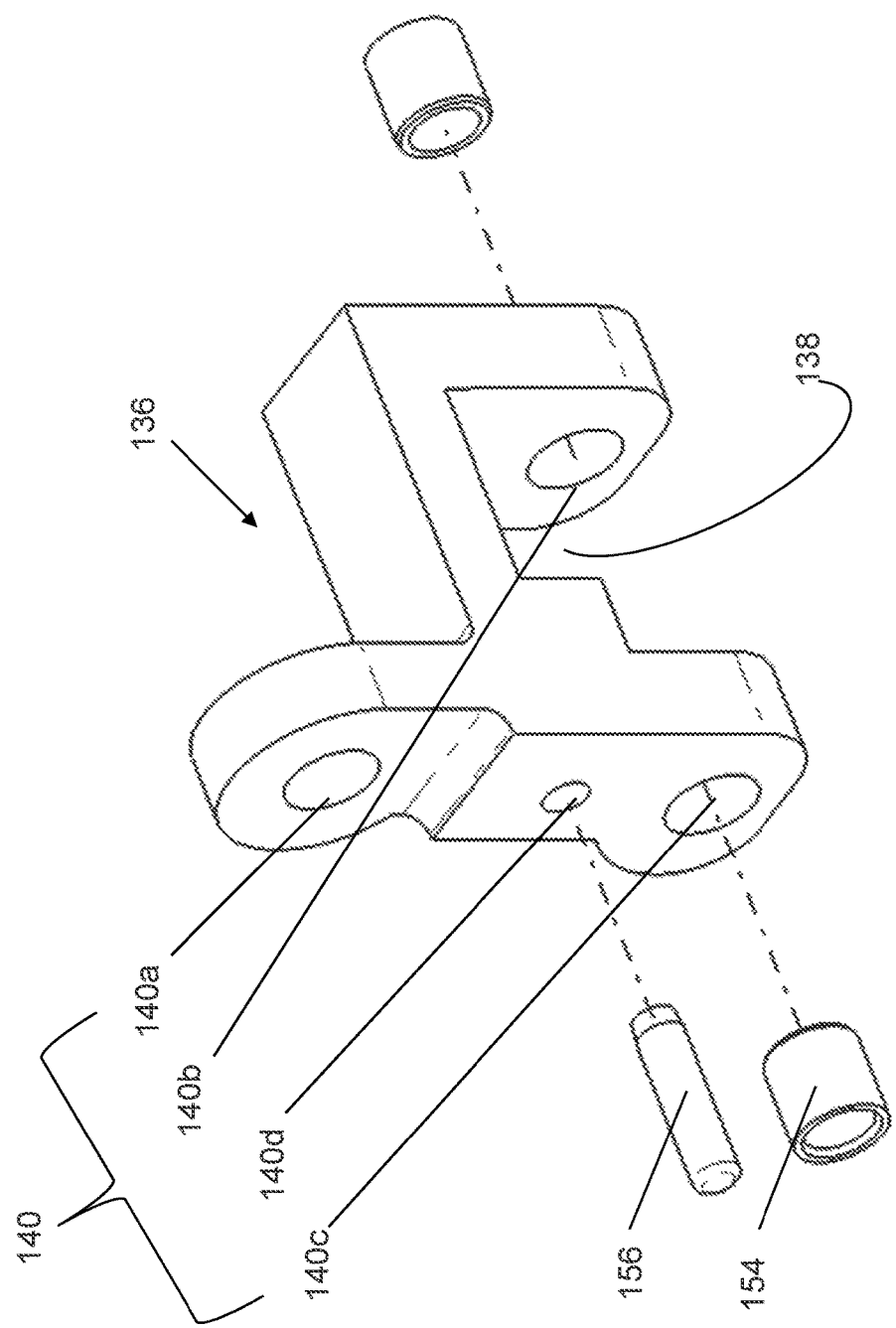
FIG. 15 is a close-up side perspective view of a gear housing.

FIG. 15 is a close-up view of the gear housing 136. The gear housing has a gear receiving portion 138 and securement areas 140. In use, the gear housing 136 receives and supports the upper/first gear member 132. The securement areas 140 may be used to secure the first gear member 132 and the weighted member 124 into place with respect thereto and to pivotally secure the gear housing 136 to the seat back. For example, securement area 140a secures the gear housing to the seat back 14. In some examples, it may secure to the extension 72 of the seat back. This securement 140a may be a hinged securement, such that securement area 140a provides a pivot point for the gear housing 136. Securement areas 140b and 140c secure the first gear 132 and the weighted member 124 to the gear housing 136. Securement area 140c may also be pivotally secured to the link 142, such that link can rotate with respect to the gear housing 136 in order to form linkage 180. One or more pins 154 may be used for these connections. Securement area 140d may interface with a pin 156 that cooperates with a spring 158 (as shown in the reference numerals on FIG. 13). This can help spring the gear housing 136 back to its neutral position after break over has occurred.

Figure 16:
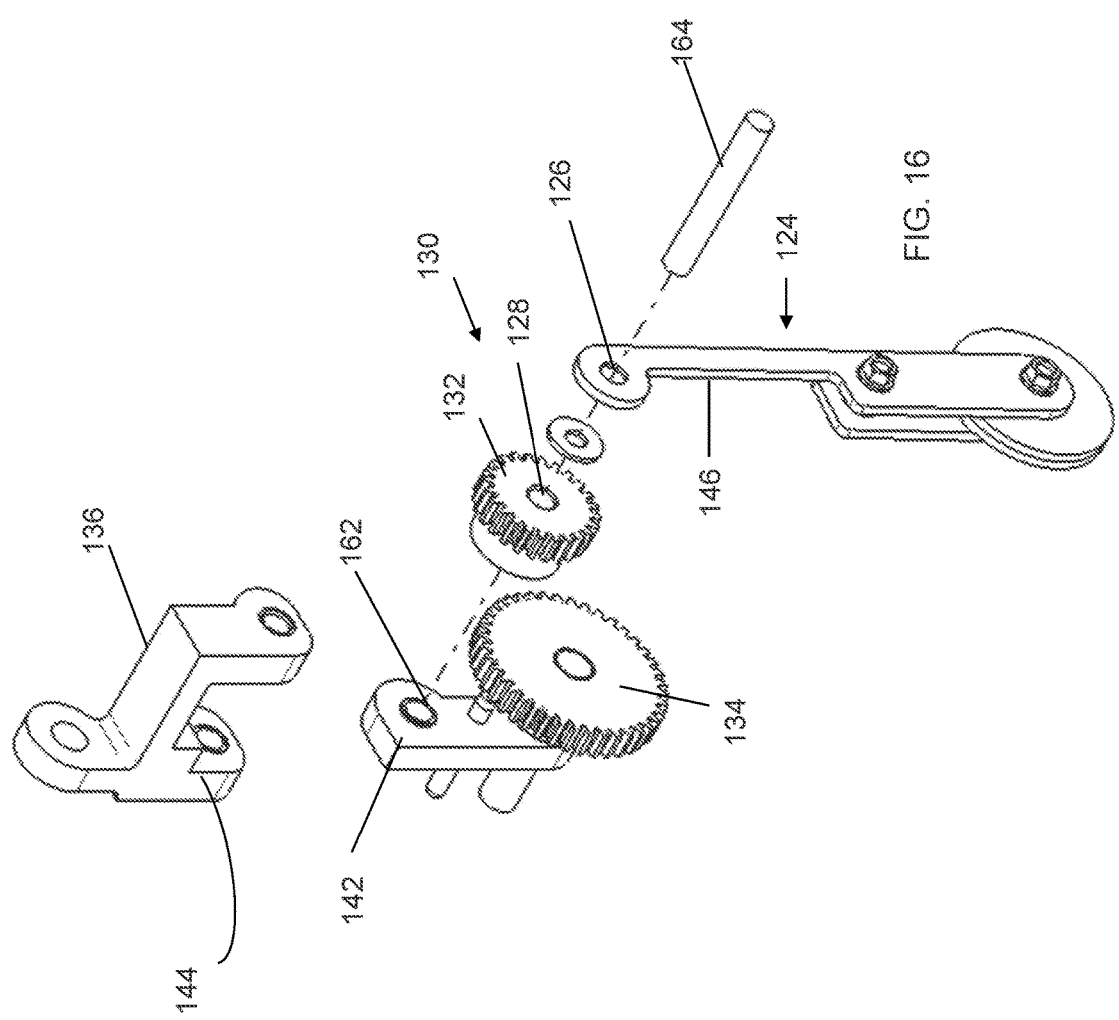
FIG. 16 is a size exploded view of a gear housing, a link, first and second gears, and a weighted member.

As illustrated by FIG. 16, the weighted number 124 has an opening 126 along its back spine 146 that provides a pivot point and that cooperates with an opening 128 in the upper/first gear member 132. These openings 126, 128 may align with the opening 162 on link 142. A pin 164 may be used to maintain the elements in secured relationship.

Figure 17:
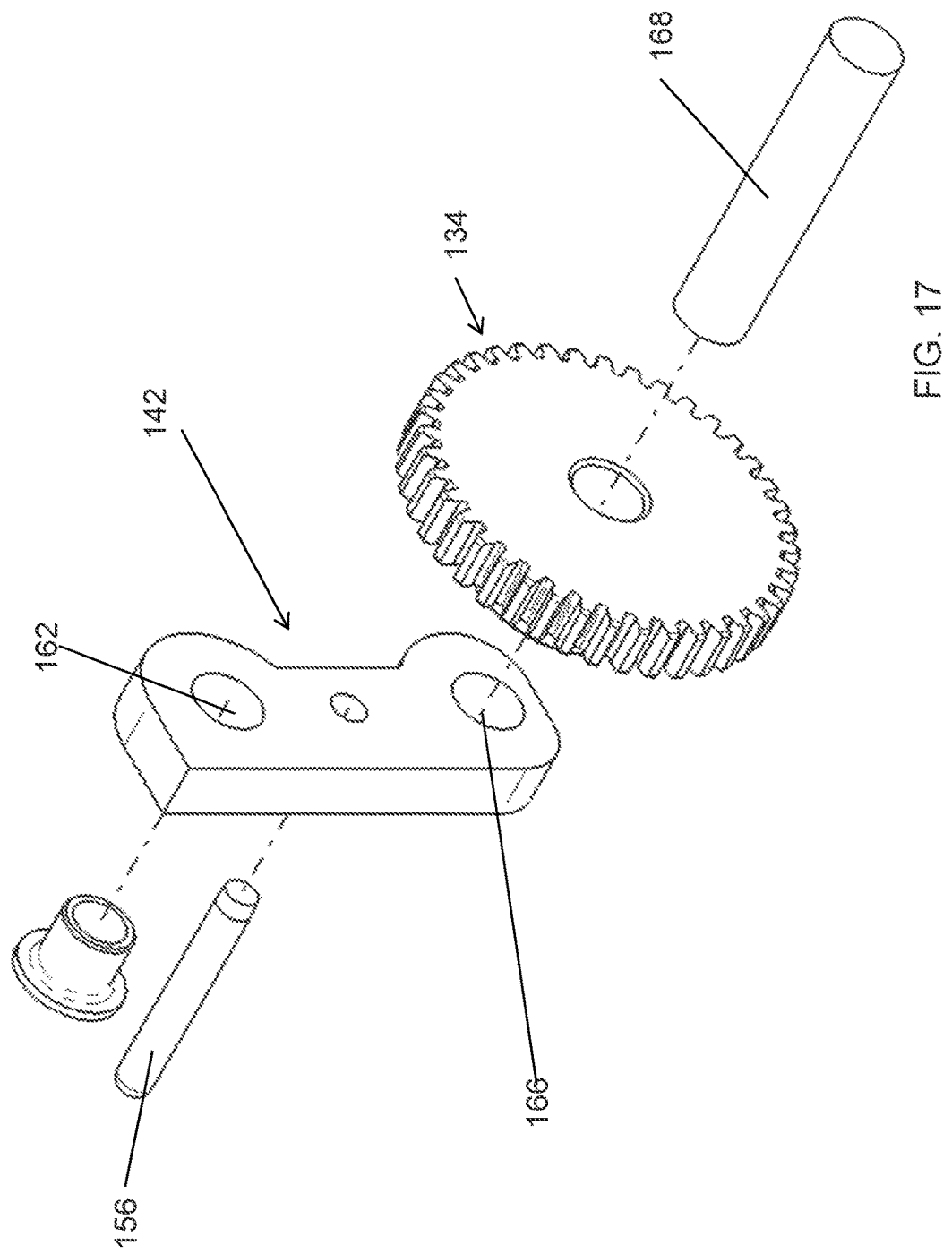
FIG. 17 is a side exploded view of a link and the second gear member.
Figure 18:
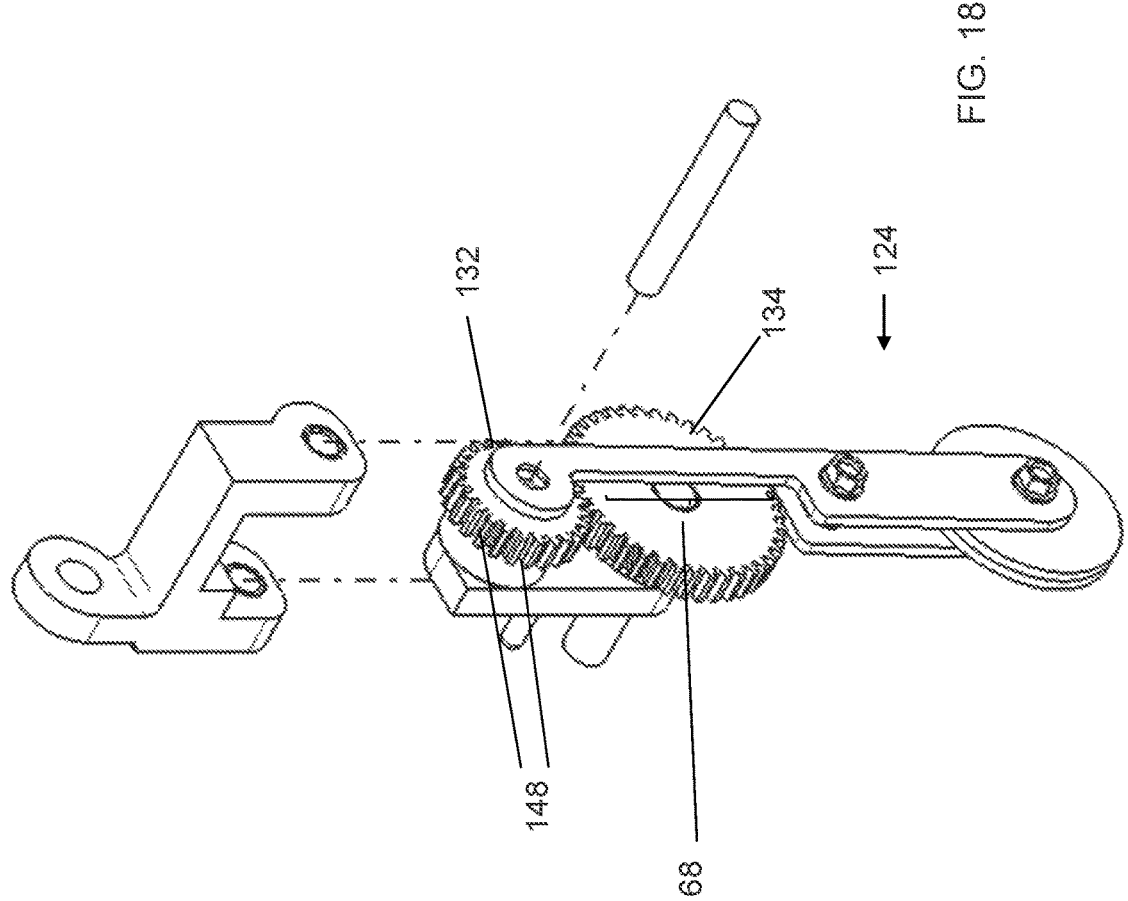
FIG. 18 is a side view of the link and gear members assembled with an exploded gear housing.

As illustrated by FIG. 17, the second gear 134 is rigidly attached to the link 142 (and support bar 150) axially in manner. Attachment may be via pin 168, which extends through an opening in the lower gear 134, through an opening 166 in the link, and secures to support bar 150, as illustrated by FIG. 13. This securement maintains the lower/second gear 134 in a stable position, allowing its gear teeth to cooperate with respect to the gear teeth of the first gear 132, but maintaining the axial position of the gear body itself in a non-movement relationship to the quadrant arm 16 and to the link 142.

When the gear system 130 rotates, it causes rotation of the linkage 180. Specifically, the upper gear 132 is rigidly attached to the swing arm/hammer/weighted member 124. The upper first gear 132 mates with the lower second gear 134. The lower gear 134 is rigidly attached to the link 142 (which functions as a lower toggle linkage joint). In effect, the two gears 132, 134 are attached to either ends of the lower toggle link 142.

The link 142 generally cooperates with the gear housing 136 in a way that allows its rotation with respect thereto but that also allows a strong abutment that does not allow movement until breakover occurs. In a specific example, the gear housing 136 has an internal ledge 144 that receives the link 142. This is shown by the rear perspective view of FIG. 20. This ledged relationship is maintained until a g-load is experienced by the device 110.

Figure 19:
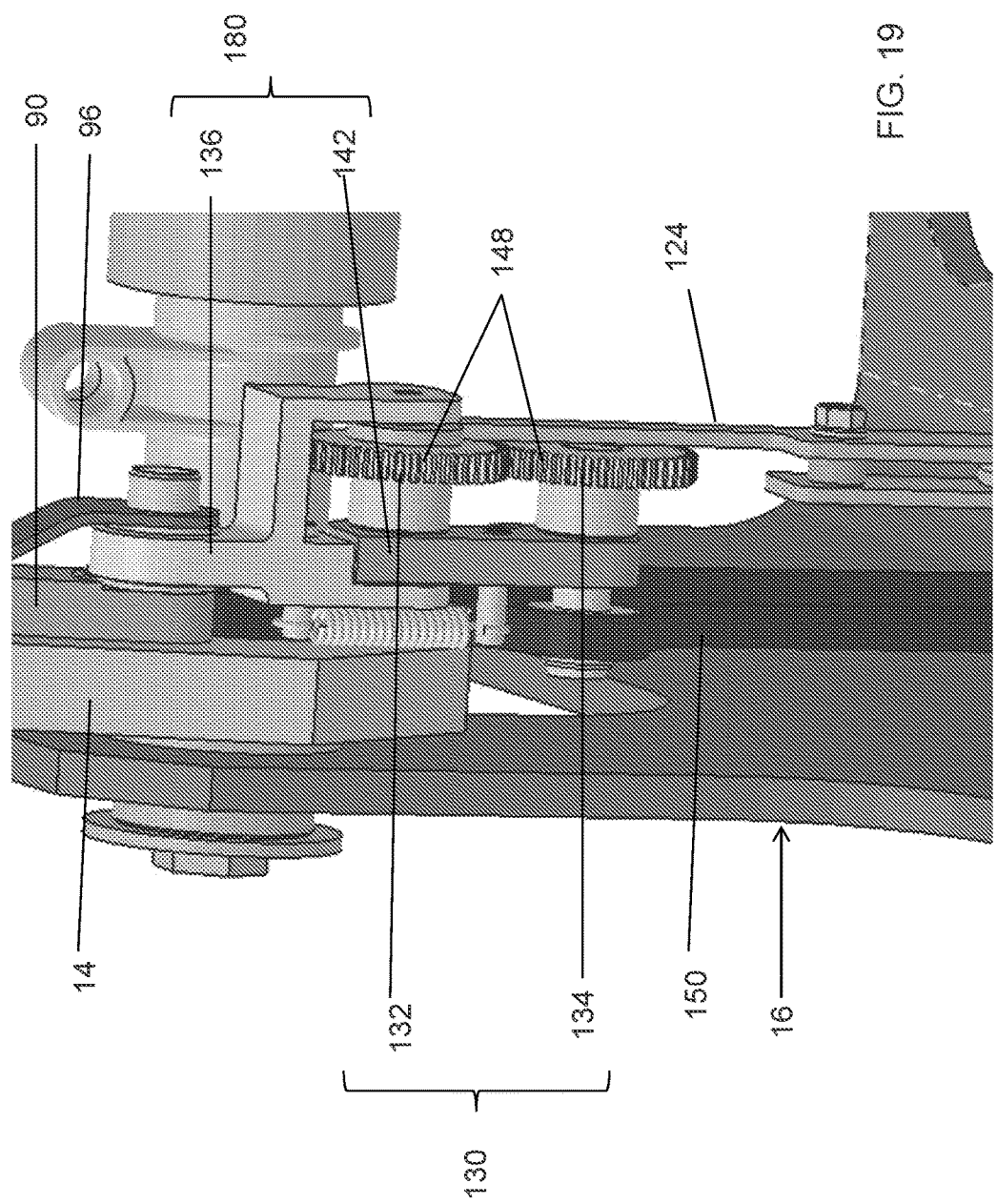
FIG. 19 is a rear perspective view of the break over device of FIGS. 13-18.
Figure 20:
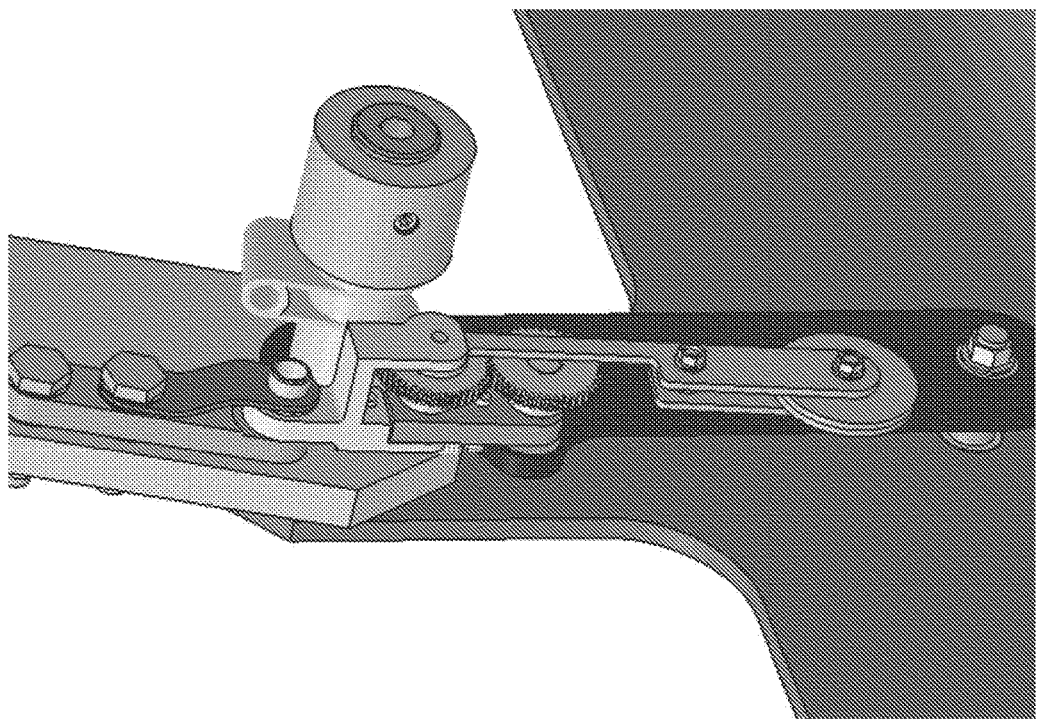
FIG. 20 is a side perspective view of the break over device of FIG. 19.

Assembly of the gear system 130 is illustrated by FIG. 19. In this figure, the first and second gears 132, 134 are configured with respect one another such that their respective gear teeth 148 mesh/cooperate with one another. The second lower gear 134 can fit within free space 68 of the weighted number 124. The gear housing 136 is secured to a securement plate 90 on the seat back assembly 14 via an intermediate bracket 96. The second gear 134 is secured to the support bar 150, which is rigidly attached to the quadrant arm 16. A completed assembly as illustrated by FIGS. 19 and 20.

When an appropriate force or g-load is experienced, the weighted member 124 is caused to move. This movement causes first gear 132 to articulate away from second gear 134, as shown by FIG. 21. This articulation causes hinged movement of the link 142 with respect to the gear housing 136 and hinged movement of the gear housing 136 with respect to the bracket 90. The gear teeth mesh and cause controlled swinging away of the weighted member 124. The forced angled relationship between the gear housing 136 and the link 142 forces movement of the seat back 14.

In any of the described embodiments, the linkage member 80 may be constructed from sheet metal and press-fit pins at joints. The linkage and weighted member can be installed as a subassembly along with each quadrant arm 16. For example, two opposite subassemblies would be attached to the seat back 14 at the seat assembly level. The subassembly could be adapted to work with multiple different backs and seats. Modification of the weighted member/hammer part can allow the mechanism to be tuned such that break over occurs at the optimal time during impact.

The interaction of a linkage member 80 and weighted member/hammer 24 initiate rotation of the seat back 14 under sufficient inertial load. The device behaves differently from traditional shearing break over mechanisms. Notably, the device functions independently of head impact loads, allowing much higher control over the timing of the break over event. The break over device 10 is also reversible, such that the seat back 14 may return to its original static condition after the break over event. The seat back 14 is simply pushed to its upright position and the extension spring 82 helps pull the linkage arms 18, 20 back to the column load position 100.

It is believed that the abuse loads that the disclosed break over device can withstand may be up to 300 pounds, and even higher. By contrast, the abuse loads that shear pin embodiments can withstand are generally around 150-200 pounds.

In the following, further examples are described to facilitate the understanding of the disclosure:

In one example, there is provided a seat break over device, comprising: a linkage member comprising first and second arms configured to hinge with respect one another; the first arm secured to a seat back and the second arm secured to a stable quadrant arm of a seat assembly; a weighted member configured to move upon application of an identified force load; wherein movement of the weighted member causes hinged movement of the linkage member, wherein hinged movement of the linkage member causes movement of the seat back with respect to the stable quadrant arm.

In another example, there is provided a seat back assembly, comprising: a seat back assembly comprising first and second ends, the seat back assembly configured to be pivotally mounted with respect to a quadrant arm; a break over device, comprising first and second linkage members positioned at or near first and second ends of the seat back assembly; each linkage member comprising first and second arms, the first arm secured to the seat back assembly, the second arm secured to the quadrant arm; a pivot point between the first and second arms; a weighted member configured to move upon application of an identified force load; wherein movement of the weighted member causes hinged movement of the linkage member at the pivot point, wherein hinged movement of each of the first and second linkage members causes hinged movement of the seat back with respect to the quadrant arm.

In another example, there may be provided a method for causing seat break over upon application of a specified force, comprising: providing a seat back assembly pivotally mounted with respect to a quadrant arm; providing a break over device comprising first and second linkage members positioned at or near first and second ends of the seat back assembly, the first and second linkage members comprising hinged arms; and a weighted member configured to move upon application of an identified force load; wherein movement of the weighted member causes hinged movement of the hinged arms of the linkage member; and wherein hinged movement of each of the first and second linkage members causes hinged movement of the seat back with respect to the quadrant arm.

There may further be provided a seat break over device, comprising: a first gear member associated with a gear housing secured to a seat back and a weighted member that articulates with respect to the seat back; a second gear member associated with a link and a support bar secured to a stable quadrant arm; the weighted member configured to move upon application of an identified force load; wherein movement of the weighted member causes geared movement between the first and second gears which causes hinged movement between the gear housing and the link, creating movement of the seat back with respect to the stable quadrant arm.

The component of any of the preceding or subsequent examples, further comprising: the weighted member comprising a push arm and a roller.

The component of any of the preceding or subsequent examples, further comprising: the weighted member having one or more disk weight members.

The component of any of the preceding or subsequent examples, further comprising: the seat back having an extension with which the weighted member pivotably cooperates.

The component of any of the preceding or subsequent examples, further comprising: the linkage member comprising a hinge between the first arm and the second arm.

The component of any of the preceding or subsequent examples, further comprising: an extension spring extending between the first arm and the second arm.

The component of any of the preceding or subsequent examples, further comprising: a support bar for securing the linkage member to the seat back and the stable quadrant arm.

The component of any of the preceding or subsequent examples, further comprising: a securement plate and an intermediate bracket securing the first arm of the linkage member to the seat back assembly.

The component of any of the preceding or subsequent examples, further comprising: a lower securement feature securing the second arm of the linkage member to the stable quadrant arm.

The component of any of the preceding or subsequent examples, further comprising: the first arm and the second arm having profiles that interface with one another when the linkage member is in a stable configuration.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of That which is claimed is:

1. A seat break over device, comprising:
   a linkage member comprising first and second arms configured to hinge with respect one another; the first arm secured to a seat back and the second arm secured to a stable quadrant arm of a seat assembly;
   a weighted member configured to move upon application of an identified force load;
   wherein movement of the weighted member causes hinged movement of the linkage member,
   wherein hinged movement of the linkage member causes movement of the seat back with respect to the stable quadrant arm.

2. The device of claim 1, wherein the weighted member comprises a push arm and a roller.

3. The device of claim 1, wherein the weighted member comprises one or more disk weight members.

4. The device of claim 1, wherein the seat back comprises an extension and wherein the weighted member pivotably cooperates with the extension.

5. The device of claim 1, wherein the linkage member comprises a hinge between the first arm and the second arm.

6. The device of claim 1, further comprising an extension spring extending between the first arm and the second arm.

7. The device of claim 1, further comprising a support bar for securing the linkage member to the seat back and the stable quadrant arm.

8. The device of claim 1, further comprising a securement plate and an intermediate bracket securing the first arm of the linkage member to the seat back assembly.

9. The device of claim 1, further comprising a lower securement feature securing the second arm of the linkage member to the stable quadrant arm.

10. The device of claim 1, wherein the first arm and the second arm comprise profiles that interface with one another when the linkage member is in a stable configuration.

11. A seat back assembly, comprising:
    a seat back assembly comprising first and second ends, the seat back assembly configured to be pivotally mounted with respect to a quadrant arm;
    a break over device, comprising first and second linkage members positioned at or near first and second ends of the seat back assembly;
    each linkage member comprising first and second arms, the first arm secured to the seat back assembly, the second arm secured to the quadrant arm;
    a pivot point between the first and second arms;
    a weighted member configured to move upon application of an identified force load;
    wherein movement of the weighted member causes hinged movement of the linkage member at the pivot point,
    wherein hinged movement of each of the first and second linkage members causes hinged movement of the seat back with respect to the quadrant arm.

12. The seat back assembly of claim 11, wherein the weighted member comprises a push arm and a roller.

13. The seat back assembly of claim 11, wherein the weighted member comprises one or more disk weight members.

14. The seat back assembly of claim 11, wherein the seat back comprises an extension and wherein the weighted member pivotably cooperates with the extension.

15. The seat back assembly of claim 11, further comprising a support bar for securing each linkage member to the seat back and the stable quadrant arm.

16. The seat back assembly of claim 11, further comprising a securement plate and an intermediate bracket securing the first arm of each linkage member to the seat back assembly.

17. The seat back assembly of claim 11, further comprising a lower securement feature securing the second arm of the linkage member to the stable quadrant arm.

18. The device of claim 11, wherein the first arm and the second arm comprise profiles that interface with one another when the linkage member is in a stable configuration.

19. A method for causing seat break over upon application of a specified force, comprising:
    providing a seat back assembly pivotally mounted with respect to a quadrant arm;
    providing a break over device comprising first and second linkage members positioned at or near first and second ends of the seat back assembly, the first and second linkage members comprising hinged arms; and a weighted member configured to move upon application of an identified force load;
    wherein movement of the weighted member causes hinged movement of the hinged arms of the linkage member; and
    wherein hinged movement of each of the first and second linkage members causes hinged movement of the seat back with respect to the quadrant arm.

20. A seat break over device, comprising:
    a first gear member associated with a gear housing secured to a seat back and a weighted member that articulates with respect to the seat back;
    a second gear member associated with a link and a support bar secured to a stable quadrant arm;
    the weighted member configured to move upon application of an identified force load;
    wherein movement of the weighted member causes geared movement between the first and second gears which causes hinged movement between the gear housing and the link, creating movement of the seat back with respect to the stable quadrant arm.

* * * * *